United States Patent
Bueche et al.

(10) Patent No.: US 9,948,742 B1
(45) Date of Patent: Apr. 17, 2018

(54) PREDICTIVE CACHING OF MEDIA CONTENT

(71) Applicant: Amazon Technologies, Inc., Seattle, WA (US)

(72) Inventors: Edward Bueche, Pleasanton, CA (US); Traci Wei-Fien Tsai Gadow, Belmont, CA (US); James Wade Hoelter, Mill Valley, CA (US); Meng (Joseph) Hsien Hsieh, San Francisco, CA (US); David Hikaru Nakayama, Palo Alto, CA (US); Robert Matthew Cowherd, Berkeley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 249 days.

(21) Appl. No.: 14/701,496

(22) Filed: Apr. 30, 2015

(51) Int. Cl.
*H04L 29/08* (2006.01)
*H04L 29/06* (2006.01)
*G08G 1/01* (2006.01)
*G06F 17/30* (2006.01)

(52) U.S. Cl.
CPC .... *H04L 67/2842* (2013.01); *G06F 17/30029* (2013.01); *H04L 65/60* (2013.01); *G08G 1/0104* (2013.01)

(58) Field of Classification Search
CPC ........ G06F 17/30041–17/30958; H04L 67/06; H04L 67/22; H04L 67/2842–67/2847; H04W 4/02–4/028; G08G 1/0104–1/0145
See application file for complete search history.

(56) References Cited

U.S. PATENT DOCUMENTS

| | | | |
|---|---|---|---|
| 9,448,961 B1* | 9/2016 | Cohen | G06F 15/16 |
| 2005/0273514 A1* | 12/2005 | Milkey | H04L 29/06027 709/232 |
| 2006/0122976 A1* | 6/2006 | Baluja | G06F 17/30864 |
| 2008/0257133 A1* | 10/2008 | Sasaki | G10H 1/0025 84/604 |
| 2011/0040707 A1* | 2/2011 | Theisen | G11B 27/105 706/12 |
| 2011/0087842 A1* | 4/2011 | Lu | G06F 17/30867 711/126 |
| 2012/0002515 A1* | 1/2012 | Muench | H04N 21/41422 369/30.03 |
| 2012/0023226 A1 | 1/2012 | Petersen et al. | |
| 2014/0059156 A1* | 2/2014 | Freeman, II | H04L 67/10 709/213 |
| 2014/0342772 A1* | 11/2014 | Mulcahy | H04W 88/06 455/553.1 |
| 2015/0003234 A1* | 1/2015 | Samardzija | H04L 67/2847 370/229 |

(Continued)

*Primary Examiner* — Wing F Chan
*Assistant Examiner* — Raji Krishnan
(74) *Attorney, Agent, or Firm* — Lee & Hayes, PLLC

(57) ABSTRACT

Technologies are disclosed herein for providing a media application service for predictive caching of media content on a mobile device. The media application service is configured to consider usage data related to media content playback by a user on one or more devices, a connectivity profile of the mobile device, and to generate a list of media content to cache on the mobile device when power and network connectivity requirements of the mobile device are met or exceeded.

20 Claims, 8 Drawing Sheets

(56) References Cited

U.S. PATENT DOCUMENTS

| | | | |
|---|---|---|---|
| 2015/0053066 A1* | 2/2015 | Hampiholi | B60W 50/14 84/602 |
| 2015/0379739 A1* | 12/2015 | Dorner | G06T 11/001 345/600 |
| 2016/0014194 A1* | 1/2016 | Kaplinger | H04L 67/06 709/217 |
| 2016/0188112 A1* | 6/2016 | Forlines | G06F 3/0416 345/173 |
| 2016/0234290 A1* | 8/2016 | Sharma | H04L 67/06 |

* cited by examiner

PREDICTIVE CACHING OF MEDIA CONTENT

BACKGROUND

Customer computing systems, including mobile devices having wireless communication capabilities, may encounter different time periods of lack of connectivity during the course of a day. Generally, as the mobile phone travels with a user there may be different geographical locations absent appropriate cellular data access for a cellular data transceiver or appropriate wireless local area network (WLAN or WIFI) access points. Thus, while traversing about or within these locations, the mobile phone may lack access to the Internet and other data services. Accordingly, different applications on the mobile phone relying on connectivity to the Internet and other data services may experience disruptions in operation due to the lack of connectivity in these locations.

As an example, if a user of a mobile device routinely accesses media content using wireless connections through the mobile device, travels through a location with diminished or limited connectivity, the user may experience disruption in media content playback. Some mobile devices and associated media content applications may attempt to circumvent connectivity issues by allowing a user to pre-emptively download media content for use "offline." Generally, the preemptive downloads require much user interaction in order to identify anticipated periods of lack of connectivity, identify desired media content for download, and manipulation of available memory on a mobile device to ensure the desired media content is available. However, if any user is unaware of a particular period of lack of connectivity or if a user forgets to preemptively download content, that the user experience may be diminished and the user may avoid using media applications relying upon good connectivity for appreciable media content playback.

The disclosure made herein is presented with respect to these and other considerations.

DETAILED DESCRIPTION

Figure 1:
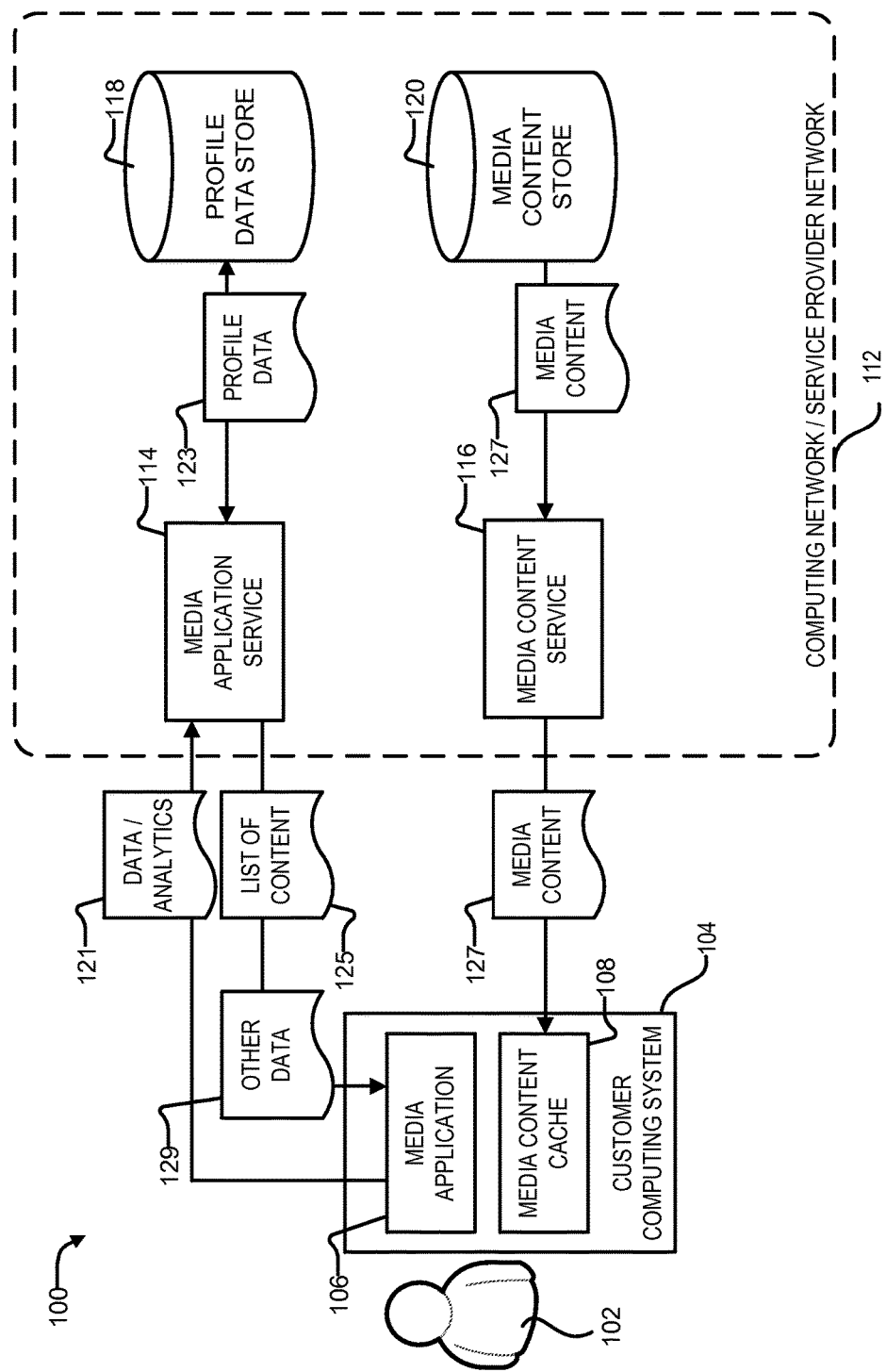
FIG. 1 is a system architecture diagram showing aspects of the configuration and operation of a media application service in one configuration presented herein.

The following detailed description is directed to technologies for providing a media application service. Utilizing the technologies described herein, a media application service can be implemented that provides functionality for predictive caching of media content to one or more customer computing devices. The media application service may be deployed through a computing network or service provider network, and may analyze activity at a customer computing system to develop profile data indicative of a connectivity profile for the customer computing system. The profile data may include particular time frames, dates, locations, and other information along with anticipated connectivity for the customer computing system. The profile data can also include information previously provided through the customer computing system related to specific media preferences or historical media content playback statistics with information related to time frames, locations, and other metrics during which the specific media was previously accessed or played back.

Using the profile data, the media application service may determine a listing of media content for caching onto the customer computing system. The listing may be based on media content played back on one device, such as a laptop or desktop computer, to be cached on another device, such as a mobile phone, mobile device, or tablet computer. The listing may also be prioritized based on factors including the time of day, travel plans, geographical location, historical analysis of media listening patterns, or other information available to the media application service. For example, the list of content can include a set of content to be played back over a period of time where there is an anticipated loss of connectivity, an anticipated change in connectivity, and/or an anticipated change in monetary charges associated with connectivity or data transfer to the customer computing system. The prioritization may be then made to ensure the period of time is filled with appropriate content. The prioritized listing may then be provided to the customer computing system for caching of content contained in the prioritized list.

Upon receipt of the prioritized list of media content, the customer computing system may request at least a portion of the prioritized list to be transmitted from a media content service. The media content service may be arranged to execute on the computing network or service provider network, and may retrieve the requested portion of the prioritized list of media content from a media content store or other storage. Upon receipt of the requested portion, the customer computing device may request additional content from the prioritized list of media content and/or initiate playback of the cached content from a user interface at the customer computing system.

Generally, the user interface may be a streamlined interface requiring limited user interaction to achieve playback of the cached content. Additionally, other user interface elements such as ranking or rating elements may allow the user to indicate a preference in future predictively cached media content. In this manner, future caching of media content may more closely follow the preferences of a user. Other implementations and additional details regarding the various components and processes described above for implementing a media application service, and other services, will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram 100 showing aspects of the configuration and operation of a media application service 114 in one configuration presented herein. As shown in FIG. 1, a customer 102 may operate a customer computing system 104. The customer computing system 104 may include any suitable computing system. For example, the customer computing system 104 can include a portable computer, mobile device, tablet computer, or similar computing devices. According to one implementation, the customer computing system 104 includes several computing systems, including a mobile device and a separate computing device such as a laptop or desktop computer.

The customer computing system 104 is configured to execute a media application 106. The media application 106 may include an application for the playback of media content such as music or videos. The media application 106 may include a user interface (described with reference to FIG. 4) for receiving selections and interactions by the customer 102. Furthermore, the media application may allow for playback of media content previously cached in a media content cache 108 co-located on the customer computing system 104.

Generally, the media application 106 may generate a stream of data and analytics 121 representative of user interaction at the customer computing system 104. The data and analytics 121 may include a click stream, business intelligence, geographical information, information received from other applications running or existing on the customer computing system, and any other suitable information. The data and analytics 121 may be transmitted to a media application service 114 executing through a computing network or service provider network 112.

The media application service, generally, is a network service configured to communicate with the media application 106 remotely. The media application service 114 may receive and process the data and analytics 121 from the customer computing system 104. Through the processing, the media application service may generate profile data 123 for storage at a profile data store 118. The profile data 123 may include connectivity data and other information relevant to the usage of the media application 106 at the customer computing system 104.

Using the generated profile data 123 and the data and analytics 121, the media application service generates a list of content 125 for transmitting to the media application 106. The list of content 125 may be prioritized in some implementations. The prioritization of the list of content 125 may be facilitated through interpretation of the profile data 123 and the data and analytics 121 such that preferable content appears higher or initially in the list of content 125, while less preferable content appears lower or subsequently in the list of content 125.

Upon receipt of the list of content 125, the media application 106 may request that at least a portion of the media content 127 appearing on the list of content 125 be retrieved through a media content service 116. The media content service 116 may execute on the service provider network 112 and may retrieve the media content 127 from a media content store 120. Upon receipt of the media content 127 from the media content service 116, the media application 106 may direct the content to be cached at the media content cache 108.

Generally, the media application service 114, the media content service 116, the profile data store 118, and the media content store 120 may be implemented at one or more data warehouses of the service provider network 112. Each service and data store may be configured to operate independently, or may possibly be implemented in combination as a combination media application/media content service and centralized data store. Other implementations are also within the scope of this disclosure.

As described above, the media application service 114 is configured to generate the list of content 125, and possibly other data 129, for use by the media application 106. Hereinafter, operation and functions of the media application service 114 are described more fully with reference to FIG. 2.

Figure 2:
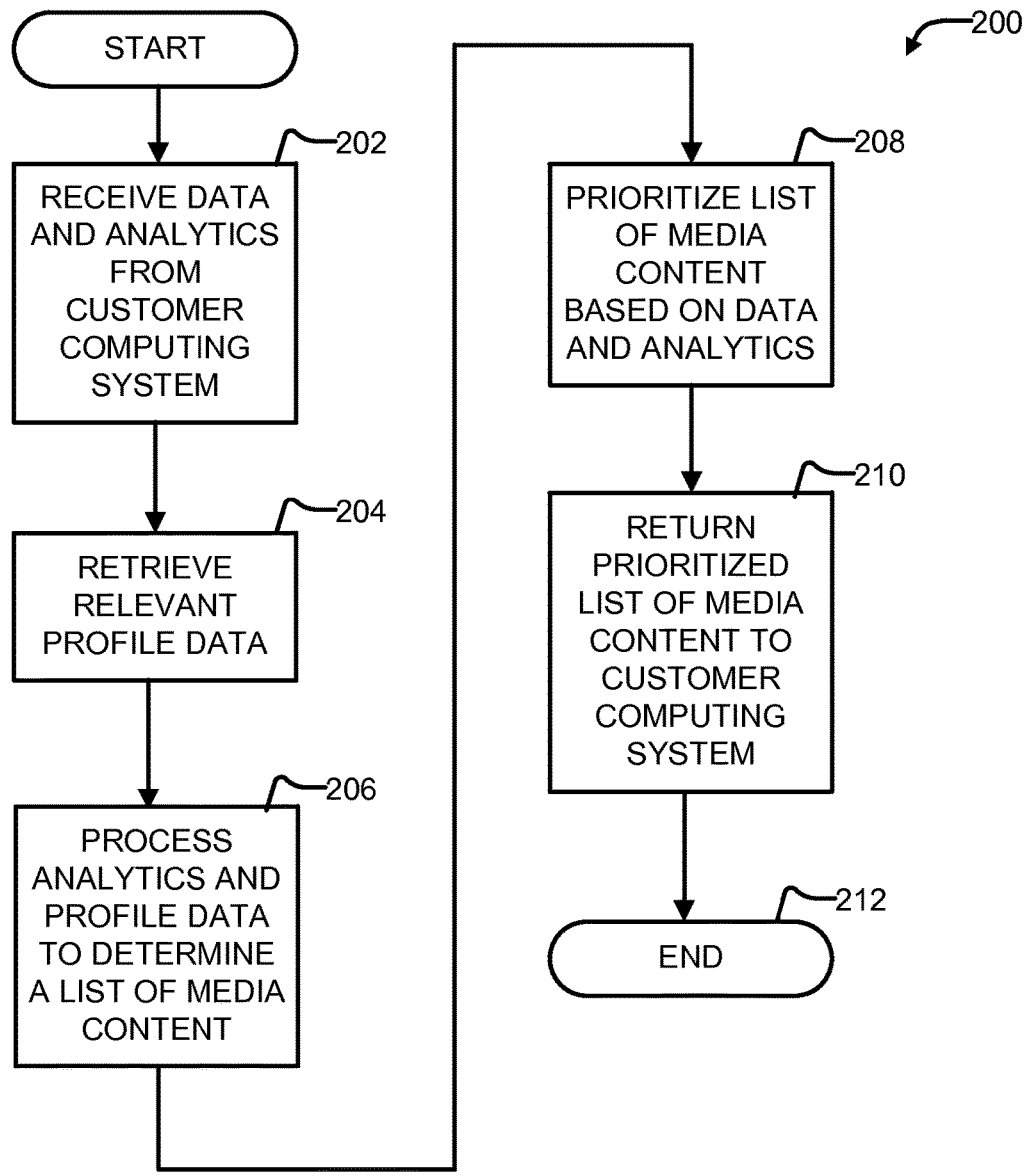
FIG. 2 is a flow diagram illustrating aspects of the operation of a media application service in one configuration disclosed herein.

FIG. 2 is a flow diagram of a method 200 illustrating aspects of the operation of the media application service 114 in one configuration disclosed herein. As shown, the media application service 114 receives the data and analytics 121 from the customer computing system 104, at block 202. The data and analytics 121 may include a click stream, business intelligence, geographical information, information received from other applications running or existing on the customer computing system, and any other suitable information.

As used herein, a click stream includes information related to the selections by a user through the media application 106. Business intelligence may include other forms of context including how often cached content from the media content cache 108 is played at the customer computing system 106. Additionally, geographical information may include general location information or detailed location information indicating where particular cached content is played. As also noted above, information from other applications, such as calendar applications including a user schedule, may also be included in some implementations.

The data and analytics 121 may also include specific media preferences or historical media content playback statistics with information related to time frames, locations, and other metrics during which the specific media was previously accessed or played back. Such media preferences can identify particular media genres, a range of tempos, a specific form of instrumental arrangements, or other attributes related to media content items played back during a particular time frame. Additionally, each particular time frame may be identified by time of day, location, recent weather patterns, recent traffic patterns, or other information such that particular forms of preferred media as related to a particular set of circumstances may be more readily predictable.

Accordingly, through receipt of the data and analytics 121, the media application service 114 may accurately create, update, and/or retrieve profile data 123 associated with a user of the customer computing system 106, at block 204. The creation of the profile data 123 may be an initial profile creation routine with subsequent operation of the media application service 114 updating the profile data 123 as usage changes.

The profile data 123 may include information related to connectivity of the customer computing system and other relevant information including anticipated travel and media content preferences. It is appreciated that this relevant information is discernable from the data and analytics 121. For example, when and whether the customer computing system 104 is receiving mains power and connected to a wireless data network may be provided by the media application 106. Additionally, when and how long a user is travelling with the customer computing system 104 may be identified through calendar entries, Global Positioning System (GPS) information, or other information enabled to be read by a user of the customer computing system 104.

Furthermore, the preferences of media playback and types of media played back during particular segments or hours of the day may also be provided by the media application 106. Furthermore, information related to the capacity of the media content cache 108 and/or storage available at the customer computing system 104 may also be determined through the media application 106 and transmitted to the media application service 114.

Thus, through creation and updating of the profile data 123, the media application service 114 can then process the received data and analytics 121 to determine a list of media content 125 for caching at the customer computing system 104, at block 206. The list of media content 125 can include content for playback during a length of time during which there is an anticipated loss of connectivity, an anticipated change in connectivity, and/or an anticipated change in monetary charges associated with data transfer to/from the customer computing system 104. As such, the list of media content can include, at least, sufficient media content to fill the length of the period of time with cached content for playback.

Generally, as used herein, "connectivity" refers to the ability of the customer computing system 104 to communicate with the service provider network 112. This connectivity can be affected by environmental changes, such as driving through a tunnel or in an area with a shortage of cellular sites or base stations. The connectivity may also be affected by adjacent structures, interior arrangements of buildings, or other considerations. Furthermore, a "change in connectivity" refers to any situation where connectivity may be affected by a change in signal strength, data throughput, quality of service, or monetary charges associated with transfer of data via an available communications protocol. Other changes in connectivity are also applicable to some implementations.

As described above, the media application service 114 can also prioritize the list of media content 125 based on a number of factors, including user preferences, the data and analytics 121, and other considerations. The prioritization can include generation of a confidence score for a plurality of media content identified in the list of content 125. The confidence score for each media content item of the list of content 125 may be based on a confidence that the media content item might be preferred by a user 102 based on a particular set of circumstances associated with the identified period of time.

The particular set of circumstances includes geographic location changes (e.g., will the period of time occur at work or at home?), travel plans (e.g., will the period of time occur on a plane trip or a road trip?), weather patterns (e.g., will there be abundant sunshine?), and other attributes and circumstances. These attributes and circumstances may be correlated to the profile data 123 to identify somewhat similar circumstances such that particular media preferences and confidence of media content items can be determined.

As one example, prioritization can include time of day preferences for a type of music (e.g., Rock for a commute, or Classical for a long workday). Prioritization can also include alternate media content choices based on anticipated weather patterns (as discerned through position information) or media choices based on a rate of travel (e.g., slower tempo music if there is a high occurrence of traffic jams in the vicinity). It is appreciated that other forms of prioritizing the list of media content 125 are also applicable. Therefore, the examples presented here are not limiting of all possible implementations of this disclosure.

Upon creation and prioritization of the list of media content 125, the media application service 114 can return the prioritized list of media content 125 to the customer computing system 104, at block 210, and the method 200 may cease at block 212.

It is noted that other data 129 may also be generated through the media application service 114 and transmitted to the customer computing system 104. The other data 129 can include additional data for display at the media application 106, a list of preference ranking selections or UI elements, or other suitable data. Additional examples of types of other data 129 is described with reference to FIG. 4. Hereinafter, a more detailed discussion of the operation and functions of the media application 106 are provided with reference to FIG. 3.

Figure 3:
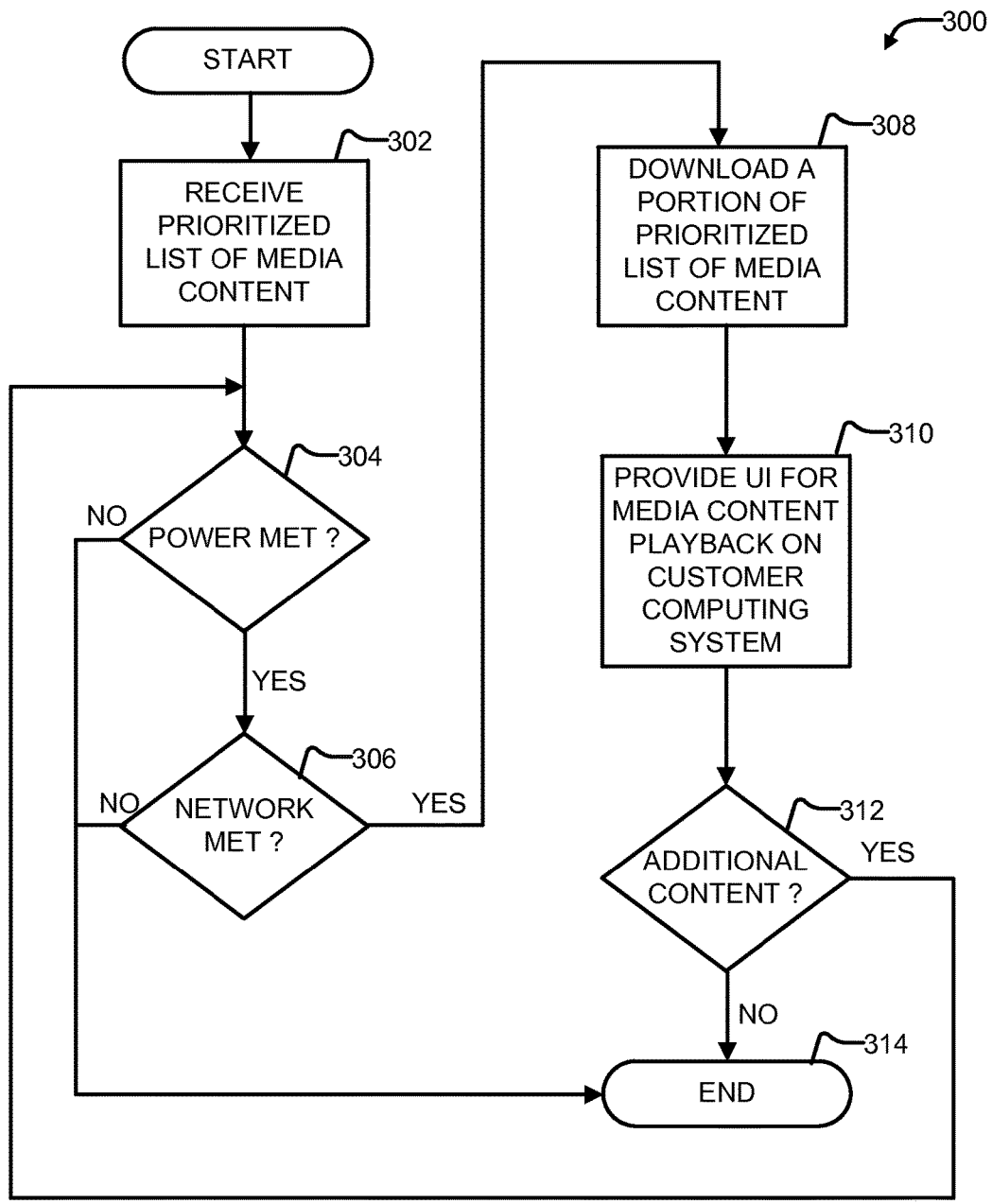
FIG. 3 is a flow diagram illustrating aspects of the operation of a client media application in one configuration disclosed herein.

FIG. 3 is a flow diagram of a method 300 illustrating aspects of the operation of the media application 106 in one configuration disclosed herein. As shown, the media application 106 received the prioritized list of media content 125 from the media application service 114, at block 302.

The prioritized list of media content 125 may also be non-prioritized in some implementations. Furthermore, the order of the list of media content 125 may be rearranged by the media application 106 in some implementations, for example, depending upon storage constraints, power requirements, connectivity issues, or other considerations.

Upon receipt of the list of media content 125, the media application 106 may determine if power requirements for downloading and caching of content are met, at block 304.

The media application 106 may also determine if network conditions for the downloading and caching of content at met, at block 306.

Generally, both of the power requirements and network conditions may be user-configurable and may include default settings. Examples of appropriate power conditions may include a threshold amount of battery power available or whether the customer computing system 104 is attached to a power mains for charging. Examples of network conditions may include determination of whether the customer computing device is connected to an appropriate wireless network (e.g., WIFI) or that no cellular data charges may apply when downloading the list of content 125. Additionally, network conditions may include user-overrides or explicit permissions to use a specific amount of data even if there will be monetary charges associated with the caching of some or all of the media content. Furthermore, a user can specify that no particular network or power requirements are necessary for a portion or all of media content caching operations. Other power requirements and network conditions may also be applicable to implementations of this disclosure. However, generally, if either set of conditions are not met, the method 300 may cease at block 314.

In the scenario where one or both of the power and network requirements are met, the media application 106 may download at least a portion of the list of media content 125, at block 308. As individual media content are received from the media content service 116, the media application may cache the media content at the media content cache 108. Upon successful caching of at least a portion of the media content based on the list of content 125, the media application 106 may provide a UI for media content playback at the customer computing system 104, at block 310.

Thereafter, or at substantially the same time, if additional content should be downloaded and cached as determined at block 312, the method 300 may iterate through blocks 304-310 to continually download and cache content until block 312 is satisfied or until power or network requirements do not meet the above criteria. Subsequently, the method 300 may cease at block 314.

Figure 4:
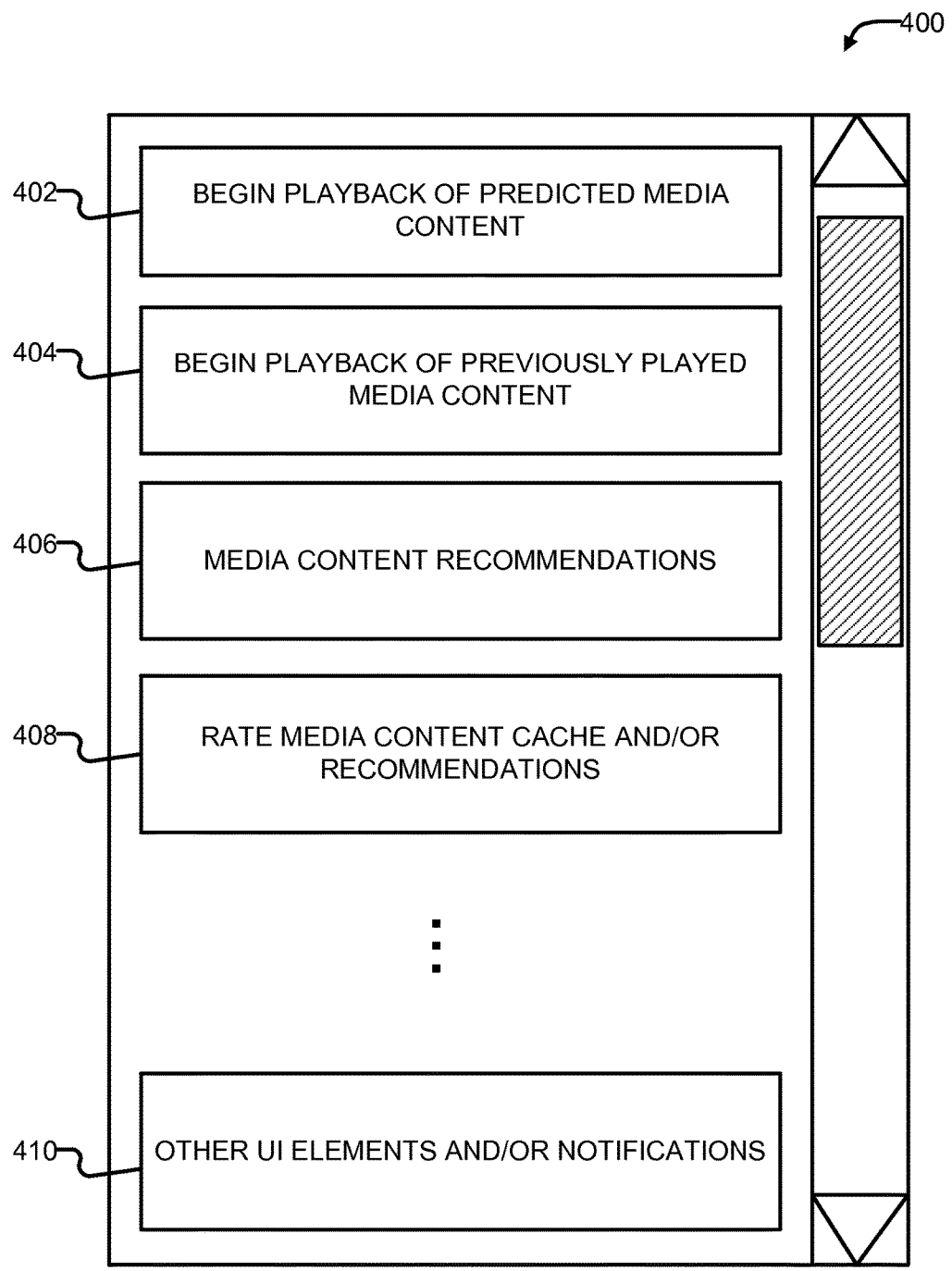
FIG. 4 is a schematic of a streamlined user interface in one configuration disclosed herein.

As described above, the media application 106 may provide a simplified or streamlined UI for interaction with a user. FIG. 4 is a schematic of a streamlined user interface 400 in one configuration disclosed herein. The UI 400 may include a plurality of UI elements 402-410 for selection by a user of the customer computing system 104. It is noted that although illustrated in a particular order, the UI 400 and individual UI elements 402-410 have been simplified and should not be construed as limiting of all possible implementations of this disclosure.

Generally, the UI 400 includes a "quick play" or immediate playback element 402 that allows for immediate playback of predictively cached content at the customer computing system 104. The element 402 therefore allows playback of predictively cached media content with only limited interaction by a user. The predictively cached content can include media content predicted but not specifically selected by a user. Additionally, a prior content playback element 404 may be provided to allow a user to playback content that was playing on a different device (such as a desktop) but was cached at the current device with a relatively simple selection of element 404. Additionally, media content recommendations 406, rating of media content cache or recommendations 408, and other notifications or UI elements 410 may also be provided.

The notifications 410 may be included with the other data 129, and may include indication that an active download and cache operation is in progress, that additional content is available, or that network resources or connectivity have changed since the last successful caching operation. Additionally, other UI elements 410 can include preference selections such as preferences for an amount of media content to be cached, whether or not predictive caching should be enabled, or other user-configurable selections as related to any of the technologies described herein. Other information may also be displayed through the notifications 410, according to any desired implementation.

Therefore, as described above, through the implementation of the media application service 114 at a service provider network, and the receipt of data and analytics 121 from a media application 106, predictive caching of media content can be facilitated that circumvents issues or changes in device connectivity and provides meaningful media content to a customer computing system 104. Furthermore, predictive caching as described herein may allow reduced and simplified user interaction while providing a richer media playback experience based on secondary information such as calendar information, geographical information, weather information, and other considerations. Hereinafter, non-limiting examples of possible operating environments and computing devices that can implement the technologies described above are described more fully with reference to FIGS. 5-8.

Figure 5:
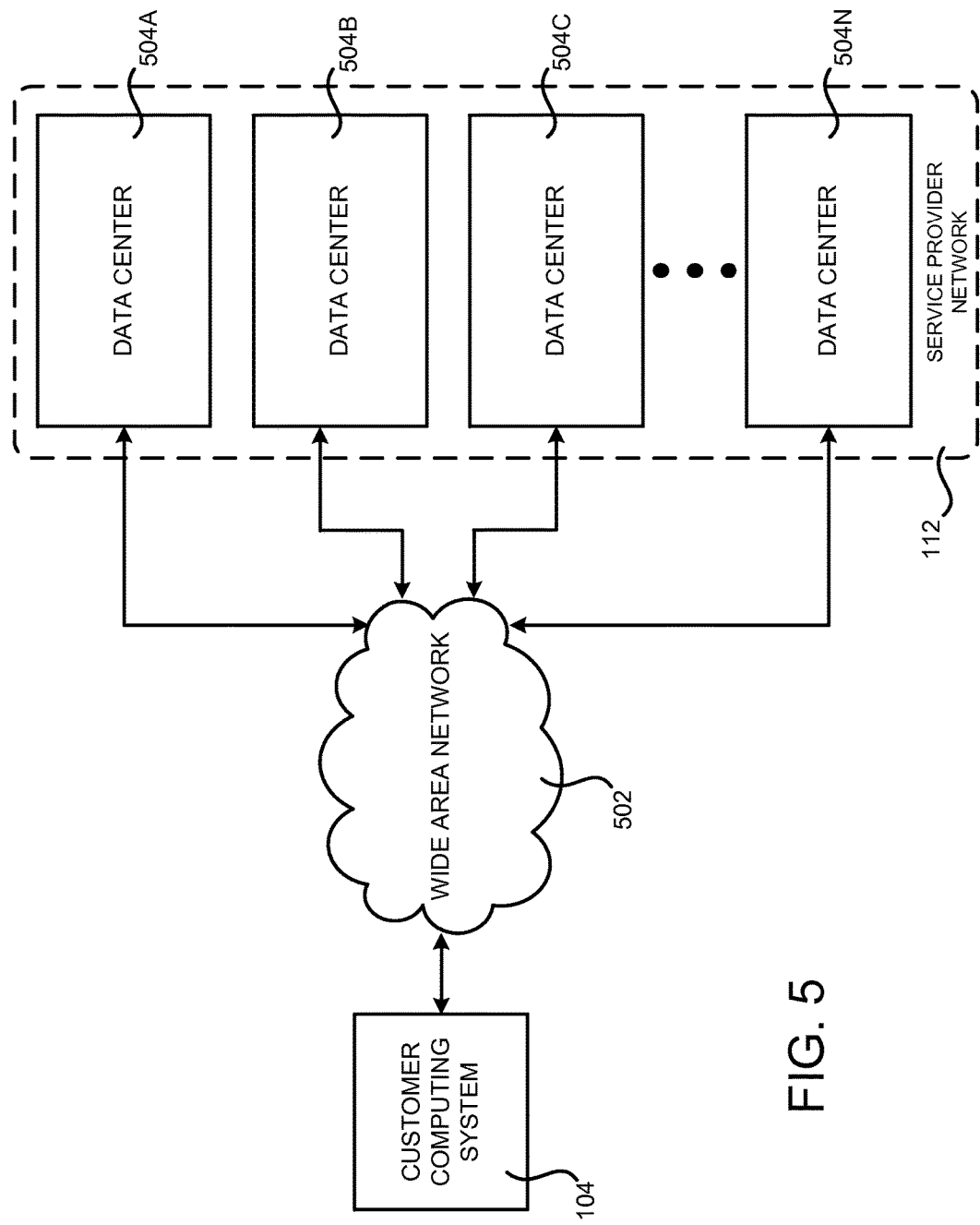
FIG. 5 is a system and network diagram that shows an illustrative operating environment for the various technologies disclosed herein that includes a service provider network that may be configured to implement aspects of the functionality described herein.

FIG. 5 is a system and network diagram that shows one illustrative operating environment for the configurations disclosed herein that includes a service provider network 112 that may be configured to provide a media application service 114 in the manner described above, according to one configuration disclosed herein. The service provider network 112 can provide computing resources that may be instantiated to support the media application service 114, the media content service 116, and any necessary data stores, on a permanent or an as-needed basis.

The computing resources provided by the service provider network 112 may include various types of computing resources, such as data processing resources, data storage resources, networking resources, data communication resources, and the like. Each type of computing resource may be general-purpose or may be available in a number of specific configurations. For example, data processing resources may be available as physical computers or virtual machine instances in a number of different configurations. The virtual machine instances may be configured to execute applications, including Web servers, application servers, media servers, database servers, and other types of applications. Data storage resources may include file storage devices, block storage devices, and the like. The service provider network 112 might also be configured to provide various network services including the media application service 114 and the media content service 116.

The computing resources provided by the service provider network 112 are enabled in one implementation by one or more data centers 504A-504N (which may be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that implements some of the technologies disclosed herein for integrating a media application service 116 within the service provider network 112 will be described below with regard to FIG. 6.

The customers and other users of the service provider network 112 may access the computing resources provided by the service provider network 112 over a network 502, such as a wide area network (WAN). For example, and without limitation, a customer computing system 104 might be utilized to access the service provider network 112 by way of the network 502. It should be appreciated that a local-area network (LAN), the Internet, or any other networking topology known in the art that connects the data centers 504 to remote customers and other users may be utilized. It should also be appreciated that combinations of such networks might also be utilized.

Figure 6:
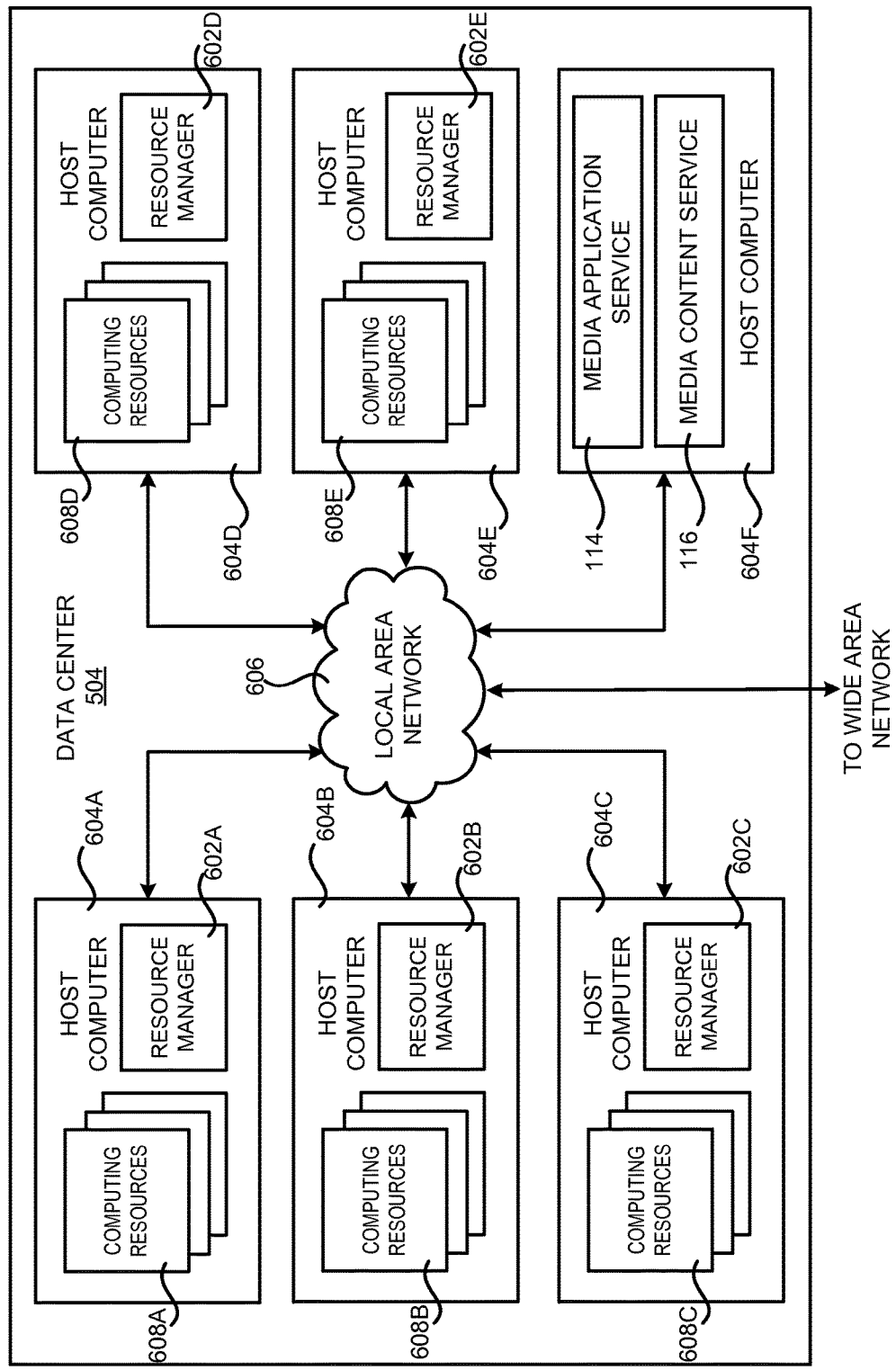
FIG. 6 is a computing system diagram that illustrates a configuration for a data center that may be utilized to implement aspects of the concepts and technologies disclosed herein.

FIG. 6 is a computing system diagram that illustrates one configuration for a data center 504 that implements aspects of the concepts and technologies disclosed herein for implementing a media application service 114, media content service 116, and other services, according to one configuration disclosed herein. The example data center 604 shown in FIG. 6 includes several server computers 602A-602F (which may be referred to herein singularly as "a server computer 602" or in the plural as "the server computers 602") for providing computing resources 608A-608E.

The server computers 602 may be standard tower, rackmount, or blade server computers configured appropriately for providing the computing resources described herein. As mentioned above, the computing resources might be data processing resources such as virtual machine instances or hardware computing systems, data storage resources, database resources, networking resources, and others. Some of the servers 602 might also be configured to execute a resource manager 604 capable of instantiating and/or managing the computing resources for processing by the media application service 114. In the case of virtual machine instances, for example, the resource manager 604 might be a hypervisor or another type of program configured to enable the execution of multiple virtual machine instances on a single server 602, for example. Server computers 602 in the data center 504 might also be configured to provide network services and other types of services, as well.

The data center 504 shown in FIG. 6 also includes a server computer 602F that may be utilized for executing some or all of the software components described above. For example, and without limitation, the server computer 602F might be configured to execute the media application service 114 and the media content service 116, which has been described in detail above. The server computer 602F might also be configured to execute other components and/or store data for providing some or all of the functionality described herein.

In the example data center 504 shown in FIG. 6, an appropriate LAN 606 is utilized to interconnect the server computers 602A-602F. The LAN 606 is also connected to the network 502 illustrated in FIG. 5. It should be appreciated that the configuration and network topology illustrated in FIGS. 1 and 5-6 has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 504A-504N, between each of the server computers 602A-602F in each data center 504, and, potentially, between computing resources in each of the data centers 504. It should be appreciated that the configuration of the data center 504 described with respect to FIG. 6 is merely illustrative and that other implementations might be utilized.

Figure 7:
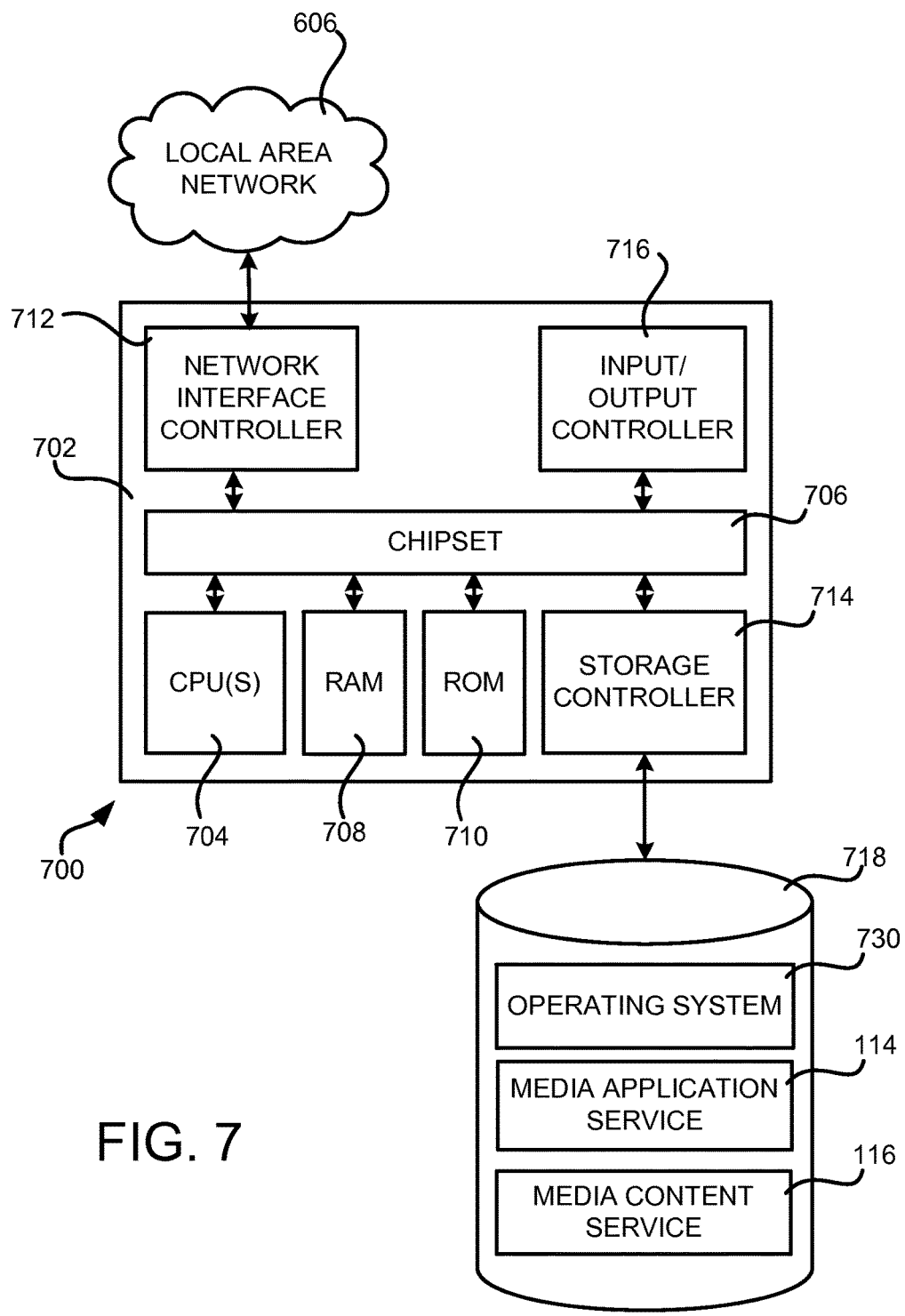
FIG. 7 is a computer architecture diagram showing an illustrative computer hardware architecture for implementing a computing device that might be utilized to implement aspects of the various technologies presented herein.

FIG. 7 shows an example computer architecture for a computer 700 capable of executing program components for implementing the media application service 114 in the manner described above. The computer architecture shown in FIG. 7 illustrates a conventional server computer, workstation, desktop computer, laptop, tablet, network appliance, e-reader, smartphone, or other computing device, and may be utilized to execute any of the software components presented herein. For example, the computer architecture shown in FIG. 7 may be utilized to execute software components for providing the media application service 114 and/or related functionality. The computer architecture shown in FIG. 7 might also be utilized to implement a customer computing system 104 or any other of the computing systems described herein.

The computer 700 includes a baseboard 702, or "motherboard," which is a printed circuit board to which a multitude of components or devices may be connected by way of a system bus or other electrical communication paths. In one illustrative configuration, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the local area network 606. The chipset 706 may include functionality for providing network connectivity through a NIC 712, such as a gigabit Ethernet adapter. The NIC 712 is capable of connecting the computer 700 to other computing devices over the network 606. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein. The mass storage device 718 may be connected to the computer 700 through a storage controller 714 connected to the chipset 706. The mass storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 700.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 718 may store other system or application programs and data utilized by the computer 700, such as the media application service 114, and/or any of the other software components and data described above. The mass storage device 718 might also store other programs and data not specifically identified herein.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various routines described above with regard to FIGS. 2-3. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Figure 8:
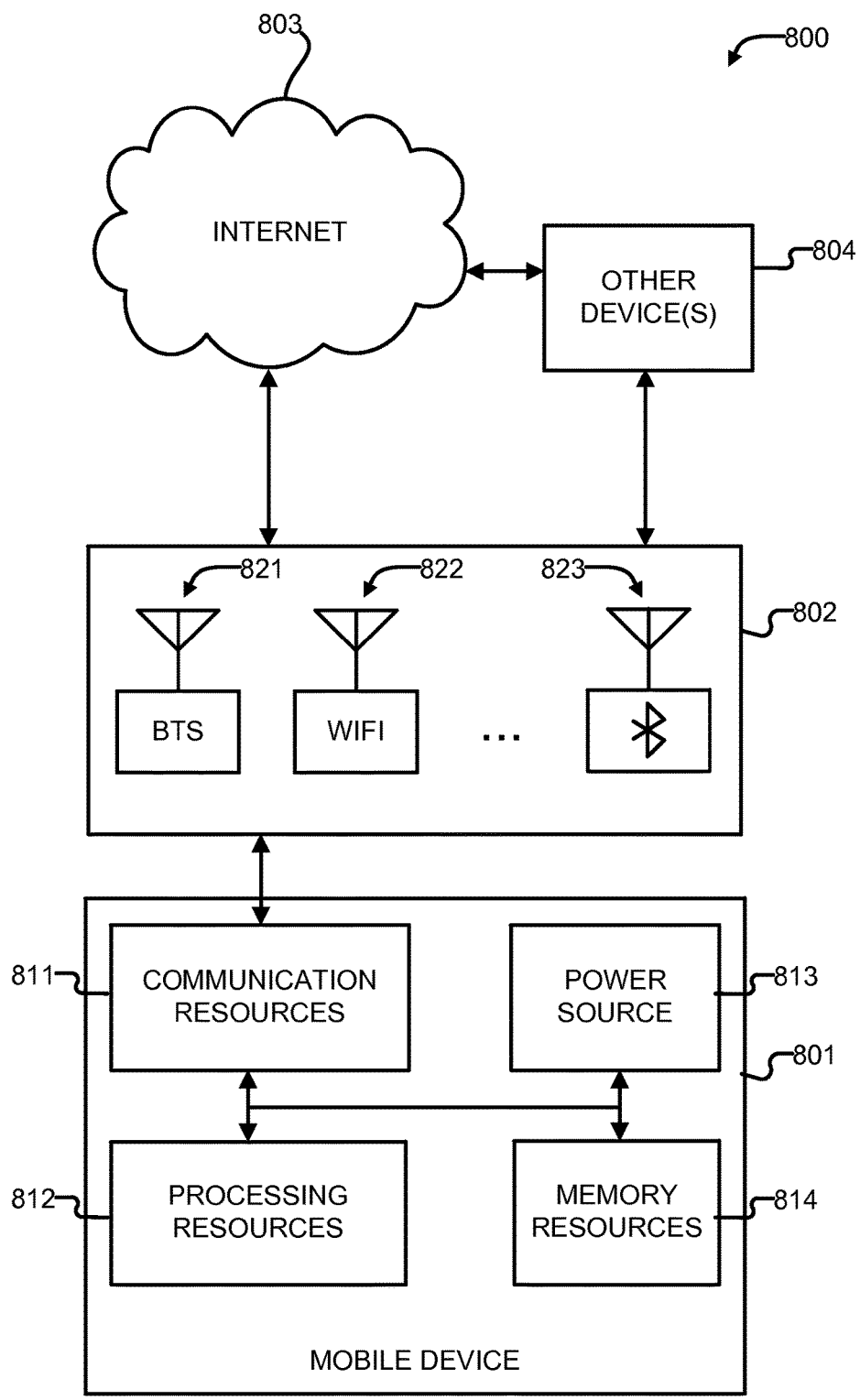
FIG. 8 is a diagram showing an illustrative mobile device communications system that might be utilized to implement aspects of the various technologies presented herein.

FIG. 8 shows an example diagram of a mobile device communications system 800 capable of allowing communications between a mobile device and a service provider network 112, or the Internet, in the manner described above. The system shown in FIG. 8 illustrates a conventional mobile device communications system, and may be utilized to facilitate transfer of media content 127 for caching at a mobile device 801 (or another customer computing system 104) as presented herein. For example, the mobile device 801 may receive media content 127 over communications elements 802 from the Internet 803 or from other devices 804. Other devices 804 may include intermediate devices such as a desktop computer, Internet router, mobile telephone, or any other suitable device operative to communicate with the Internet 803 and/or the service provider network 112.

Generally, the mobile device 801 can include communication resources 811 arranged to communicate via one or more communications protocols. The communications protocols can include, for example, cellular communications via a cellular communication element 821, wireless networking communications via a wireless networking element 822, short-range or low-energy communications (such as BLUETOOTH or near-field communications) via a short-range communication element 823, or other communication protocols.

The mobile device 801 may also include processing resources 812 including one or more computer or mobile processors. The computer or mobile processors may include multiple cores, specialized processors, or other suitable processing elements configured to execute at least a media application such as media application 106. Additionally, the mobile device 801 can include a power source 813 such as a battery and appropriate charging circuitry, a replaceable battery, or any other power source. Memory resources 814 may also be included in the mobile device 801 to allow for caching of media content through a media content cache 108, for example.

It will be appreciated that the mobile device architecture 800 may not include all of the components shown in FIG. 8, may include other components that are not explicitly shown in FIG. 8, or may utilize an architecture completely different than that shown in FIG. 8.

Based on the foregoing, it should be appreciated that technologies for providing a media application service, and for predictive caching of media content, have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A computer-implemented method comprising:
    receiving usage data from a computing system, the usage data including data related to playback of media content at the computing system or a mobile device;
    retrieving profile data related to the mobile device, the profile data including at least a connectivity profile indicating a time period associated with an anticipated change in connectivity;
    processing at least a portion of the usage data, the usage data including how often cached content is played at the mobile device, the processing including interpreting the connectivity profile to determine an approximate length of time of the time period and identifying media content that will be played for the length of time;
    determining, based at least in part on the processing and at least in part on anticipated traffic patterns for the mobile device during the time period, a list of media content to be cached at the mobile device, wherein the list of media content includes:
        a genre of media content for the anticipated traffic patterns for the mobile device during the time period;
    providing at least a portion of the media content described in the list of media content to the mobile device for caching based, at least in part, on a determination that a predetermined set of power requirements and network connectivity requirements have been met or exceeded by the mobile device; and
    providing a notification to at least one of the mobile device or the customer computing system for display, the notification indicating a state of caching of the media content.

2. The computer-implemented method of claim 1, wherein the usage data is related to playback of media content at the computing system, and wherein the computing system and the mobile device are separate devices.

3. The computer-implemented method of claim 1, wherein the usage data comprises a click stream of user selections at the computing system and information received from other applications running or existing on the computing system.

4. The computer-implemented method of claim 3, wherein the information received from other applications comprises calendar or schedule information related to a user of the mobile device.

5. The computer-implemented method according to claim 1, wherein the list of media includes alternate media content based at least in part on anticipated duration of the time period, anticipated weather patterns for the time period, or anticipated rate of travel for the time period.

6. One or more computing devices comprising:
    one or more processors; and
    one or more non-transitory computer-readable media storing computer-executable instructions that, when executed by the one or more processors, cause the one or more processors to perform acts comprising:
        receive usage data describing playback preferences of media content for a user of a mobile device, the usage data including at least a frequency with which previously cached media content is consumed at the mobile device;
        retrieve profile data related to the mobile device, the profile data including at least a connectivity profile indicating a time period with an anticipated change in monetary charges associated with data transfer to and from the mobile device;
        interpret the connectivity profile to identify media content that will be played for the time period;
        determine, based at least in part on the usage data and the profile data and at least in part on anticipated traffic patterns for the mobile device during the time period, a list of media content to be cached at the mobile device, wherein the list includes a genre of media content for the anticipated traffic patterns; and
        provide at least a portion of the media content described in the list of media content to the mobile device for caching based, at least in part, on a determination that a power requirement and a network connectivity requirement have been met or exceeded by the mobile device.

7. The one or more computing devices of claim 6, wherein the usage data comprises data and analytics related to the playback of media content at a customer computing system, wherein the customer computing system and the mobile device are separate devices, and wherein the connectivity profile is associated with connectivity of the mobile device.

8. The one or more computing devices of claim 6, wherein the acts further comprise prioritizing the list of media content based on the usage data and the connectivity profile, and providing the prioritized list of media content to the mobile device.

9. The one or more computing devices of claim 8, wherein prioritizing of the list of media content is further based on anticipated geographic location information for the mobile device during the time period, anticipated weather patterns for the mobile device during the time period.

10. The one or more computing devices of claim 6, further comprising a media content service deployed on the one or more computing systems, the media content service configured to retrieve portions of the list of media content and to provide the portions of the list of media content to the mobile device.

11. The one or more computing devices of claim 6, further comprising a profile data store configured to store the profile data related to the user of the mobile device and to receive updates to the profile data based on the received usage data.

12. The one or more computing devices of claim 11, further comprising the mobile device in communication with the one or more computing systems, the mobile device having a media application deployed thereon and configured to:
   receive the list of media content;
   determine that a predetermined set of power requirements and network connectivity requirements have been met or exceeded; and
   in response to the determination, download and cache at least the portion of the media content described in the list of media content.

13. A mobile device, comprising:
   one or more processors;
   one or more power sources;
   one or more network interfaces; and
   a media application executing on the one or more processors, the media application configured to:
      generate usage data describing playback preferences of media content for a user of the mobile device, the usage data including a frequency with which previously cached media content is played at the mobile device;
      receive a list of media content arranged based, at least in part, on the usage data including the frequency, a time period associated with an anticipated change in connectivity, and anticipated traffic patterns for the mobile device during the time period, wherein the list includes sufficient media content to playback for the length of time of the time period, and wherein the list includes a genre of media content for the anticipated traffic patterns;
      determine that a predetermined set of power requirements for the one or more power sources and network connectivity requirements of at least one of the one or more network interfaces have been met or exceeded;
      in response to the determination, download and cache at least a portion of the media content described in the list of media content while the predetermined set of power requirements and network connectivity requirements are met or exceeded; and
      provide a notification to the mobile device for display, the notification indicating a state of downloading and caching of the media content.

14. The mobile device of claim 13, further comprising a memory in communication with the one or more processors, the memory having a media content cache deployed thereon for caching the downloaded portion of the media content.

15. The mobile device of claim 13, wherein the usage data comprises data related to playback of media content at the mobile device, time periods where the mobile device lacks connectivity, and a click stream of user interactions at the media application.

16. The mobile of claim 15, wherein generating the usage data further comprises receiving scheduling information for a user of the mobile device and wherein the list of content is further arranged based on the scheduling information and the time periods wherein the mobile device lacks connectivity.

17. The mobile device of claim 13, wherein the media application is further configured to provide a user interface (UI) in response to downloading and caching the media content.

18. The mobile device of claim 17, wherein the UI is a simplified UI configured to enable fast playback of cached media content with limited interaction by the user of the mobile device.

19. The mobile device of claim 13, wherein the mobile device is in communication with a media application service configured to:
   receive the usage data;
   retrieve profile data related to the mobile device, the profile data including at least a connectivity profile describing a time period with an anticipated loss of connectivity;
   process the usage data to determine a list of media content to be cached at the mobile device, the processing comprising interpreting the connectivity profile to identify media content that can be played for the time period; and
   provide the list of media content to the mobile device.

20. The mobile device of claim 13, wherein the media application includes one or more preference selections including at least one of an amount of media content to be cached or whether predictive caching should be enabled.

* * * * *

UNITED STATES PATENT AND TRADEMARK OFFICE
CERTIFICATE OF CORRECTION

| | | |
|---|---|---|
| PATENT NO. | : 9,948,742 B1 | Page 1 of 1 |
| APPLICATION NO. | : 14/701496 | |
| DATED | : April 17, 2018 | |
| INVENTOR(S) | : Edward Bueche et al. | |

It is certified that error appears in the above-identified patent and that said Letters Patent is hereby corrected as shown below:

In the Claims

Replace Column 14, Line 38, with -- provide at least a portion of media content --

Signed and Sealed this
Tenth Day of July, 2018

Andrei Iancu
*Director of the United States Patent and Trademark Office*